(12) United States Patent
Hokkanen

(10) Patent No.: US 8,223,126 B2
(45) Date of Patent: Jul. 17, 2012

(54) APPARATUSES AND METHODS FOR FACILITATING USER DESIGNATION OF DEVICE FUNCTIONS

(75) Inventor: Petri E. Hokkanen, Salo (FI)

(73) Assignee: Nokia Corporation, Espoo (FI)

( * ) Notice: Subject to any disclaimer, the term of this patent is extended or adjusted under 35 U.S.C. 154(b) by 704 days.

(21) Appl. No.: 11/787,474

(22) Filed: Apr. 17, 2007

(65) Prior Publication Data

US 2008/0259038 A1    Oct. 23, 2008

(51) Int. Cl.
*G09G 5/00* (2006.01)
(52) U.S. Cl. .......................................... 345/169; 345/156
(58) Field of Classification Search .......... 345/168–181, 345/156–158; 455/565, 566; 341/22; 463/37–38
See application file for complete search history.

(56) References Cited

U.S. PATENT DOCUMENTS

| | | | |
|---|---|---|---|
| 5,805,084 A * | 9/1998 | Mannisto | 341/22 |
| 6,539,243 B1 * | 3/2003 | Kimura et al. | 455/550.1 |
| 6,795,011 B1 * | 9/2004 | Berthoud et al. | 341/173 |
| 7,602,377 B2 * | 10/2009 | Kim | 345/169 |
| 7,633,412 B2 * | 12/2009 | Lee et al. | 341/22 |
| 7,649,477 B2 * | 1/2010 | Lee et al. | 341/22 |
| 7,668,829 B2 * | 2/2010 | Chu et al. | 455/412.1 |
| 7,683,886 B2 * | 3/2010 | Willey | 345/169 |
| 2002/0078393 A1 * | 6/2002 | Parker | 713/324 |
| 2002/0115425 A1 * | 8/2002 | Carter | 455/410 |
| 2002/0146989 A1 * | 10/2002 | Moriki | 455/90 |
| 2004/0203604 A1 * | 10/2004 | Pugliese | 455/411 |
| 2004/0204123 A1 * | 10/2004 | Cowsky et al. | 455/565 |
| 2005/0062724 A1 * | 3/2005 | Kim et al. | 345/168 |
| 2005/0107126 A1 * | 5/2005 | Kim | 455/565 |
| 2005/0116840 A1 * | 6/2005 | Simelius | 341/22 |
| 2005/0130642 A1 * | 6/2005 | Scott | 455/418 |
| 2006/0030367 A1 * | 2/2006 | Cowsky et al. | 455/565 |
| 2006/0112428 A1 | 5/2006 | Etelapera | |
| 2006/0285678 A1 * | 12/2006 | Ota | 379/433.01 |
| 2008/0070622 A1 * | 3/2008 | Lee | 455/556.1 |
| 2008/0316030 A1 * | 12/2008 | Deng et al. | 340/571 |

FOREIGN PATENT DOCUMENTS

| | | |
|---|---|---|
| EP | 0768786 | 4/1997 |
| GB | 2344260 A | 5/2000 |

OTHER PUBLICATIONS

Nokia 6800 Security Settings, http://www.nokia.com/EUROPE_NOKIA_COM_3/r2/support/tutorials/6800/english/getting_started/setting_up/security_settings.html, p. 1, 2003.

(Continued)

*Primary Examiner* — Duc Dinh
(74) *Attorney, Agent, or Firm* — Harrington & Smith

(57) ABSTRACT

Systems, apparatuses and methods for facilitating input function designation. A function of a device specified via a user input is identified, and one of a plurality of sub-functions of the identified function is activated, based on an associated durational user input. One representative function is a keyguard function, and user invocation of such a keyguard function is recognized, where the keyguard function is associated with at least a normal keyguard sub-function and security keyguard sub-function. A duration of the user input associated with the user invocation of the keyguard function is determined and one of the normal keyguard sub-function or the security keyguard sub-function is activated, depending on the duration of the user input.

18 Claims, 6 Drawing Sheets

OTHER PUBLICATIONS

Nokia Connecting People, FAQ Search—Answer, http://europe.nokia.com/faqsearch, pp. 1-2, printed from the internet Mar. 16, 2007.

Nokia 3060 User Guide (excerpt), 2005, retrieved from internet on Sep. 19, 2008, http://www.comparecellular.com/user_guides_guide.asp?1=&UserGuideID=621>.

Nokia 6030 User Guide (excerpt), 2005, retrieved from internet on Sep. 19, 2008, http://www.comparecellular.com/user_guides_guide.asp?1=&UserGuideID=621>, pp. 1, 2, 15, and 33.

Translated Office action dated Mar. 8, 2011 from parallel Korean Application No. 10-2009-7021001, 5 pages.

* cited by examiner

APPARATUSES AND METHODS FOR FACILITATING USER DESIGNATION OF DEVICE FUNCTIONS

FIELD OF THE INVENTION

This invention relates in general to invoking device functionality, and more particularly to systems, methods and apparatuses for facilitating user input function designation.

BACKGROUND OF THE INVENTION

Advances in communication infrastructures and technologies have made mobile communication a normal, as well as expected, part of today's society. Mobile communication devices, such as mobile phones, come in a variety of sizes and shapes, and have various mechanisms and functions. The size of many mobile phones, personal digital assistants (PDA), small computing devices and other communication devices is conveniently small enough to exhibit pure portability. For example, most mobile phones and PDAs can easily be carried in their users' pockets. They are also often transported in briefcases, bags, purses, etc. This portability, while convenient, presents a greater risk of inadvertent actuation of exposed user input mechanisms relative to fixed devices (e.g., desktop computing devices). For example, a key(s) on a mobile phone may be inadvertently actuated when placed in the user's pocket or briefcase. The result can be unintentional dialing of a phone number, unintentional invocation of an application, or the like.

To prevent such unintentional events, mobile devices may include a function to lock the device keypad or other user input, so that the keys or other input cannot inadvertently be triggered and cause those unintentional events to occur. Such a locking mechanism may require a user-defined code to be entered to unlock the user input, thereby providing some level of security against unauthorized use. Further, automatic locking mechanisms can lock the user input after some predetermined time of non-use. Whether the user manually locks the user input or it is done automatically, the security code may have to be entered every time the user attempts to operate the device. This can be very burdensome to the user, particularly when the device is being used in an environment that is unlikely to need such security mechanisms, such as the user's home.

Accordingly, there is a need for devices and method for addressing at least the problem of having to enter security codes to unlock the user input for a device all of the time, or at least at times when it is unnecessary or inconvenient to the user. A further need exists for apparatuses and methods for ensuring that user input devices can be locked to avoid unintentional actuation of user input mechanisms, without necessitating incessant entry of security codes by the user. The present invention fulfills these and other needs, and offers numerous advantages over the prior art.

SUMMARY OF THE INVENTION

To overcome limitations in the prior art described above, and to overcome other limitations that will become apparent upon reading and understanding the present specification, the present invention discloses a system, apparatus and method for facilitating user input function designation.

In accordance with one embodiment of the invention, a method is provided that involves identifying a function of a mobile device specified by way of a user input. The method involves activating one of the plurality of sub-functions of the identified function based on an associated durational user input. It should be recognized that the "sub-function" may involve a single action or more than one action. For example, activating one of a plurality of sub-functions may involve activating a sub-function that performs multiple actions.

According to other related embodiments of such a method, identifying a function may involve identifying a keyguard function entered by way of the user input. Further, activating one of the multiple sub-functions of the identified function may involve activating one of a normal keyguard sub-function and a security keyguard sub-function based on the associated durational user input.

Another embodiment of such a method involves activating the desired sub-function by activating one of the plurality of sub-functions of the identified function based on a duration of a last user input in a plurality of user input manipulations.

In another embodiment, identifying the function of a mobile device specified by way of the user input involves identifying the function using multiple keystrokes, and where activating the desired sub-function involves activating the sub-function associated with a duration in which one of the multiple keystrokes is actuated. In another embodiment where the function is identified by way of a plurality of keystrokes, activating the sub-function involves activating the sub-function associated with a duration in which the last of the multiple keystrokes is actuated.

One embodiment involves activating the sub-function of the identified function by activating one of the sub-functions of the identified function based on an associated durational user input actuated following identification of the function.

In another embodiment of such a method, a first of the sub-functions is associated with a user input of a first duration, and a second of the sub-functions is associated with the user input of a second duration. In such an embodiment, activating one of the sub-functions may involve activating the first sub-function when the user input has been actuated for a duration no greater than the first duration. In another embodiment, activating one of the sub-functions may involve activating the second sub-function when the user input has been actuated for a duration greater than or equal to the second duration. In still another embodiment, activating one of the sub-functions may involve activating the first sub-function when the user input has been actuated for a duration no greater than the first duration, and activating the second sub-function when the user input has been actuated for a duration greater than or equal to the second duration.

In accordance with another embodiment of the invention, a method is provided that includes recognizing user invocation of a keyguard function having at least an associated normal keyguard sub-function and security keyguard sub-function. A duration of a user input associated with the user invocation of the keyguard function is determined. A normal keyguard sub-function or the security keyguard sub-function is activated, depending on the duration of the user input.

According to a more particular embodiment of such a method, the keyguard function may include one or more additional sub-functions in addition to the normal and security keyguard sub-functions. In such a case, activating one of the normal or security keyguard sub-functions may further involve activating one of the normal keyguard sub-function, security keyguard sub-function, or additional sub-function depending on the duration of the user input.

Another embodiment of such a method may further involve determining whether the duration of the user input falls within a first or second predetermined duration range. In such a case, activating one of the normal or security keyguard sub-functions may involve activating the normal keyguard if the duration falls within the first predetermined duration range and activating the security keyguard if the duration falls within the first predetermined duration range.

In still another embodiment, recognizing user invocation of a keyguard function involves recognizing one or more user input actuations that invoke the keyguard function. In a more particular embodiment, recognizing one or more user input actuations includes recognizing a series of keystrokes on a keypad, and where determining a duration of a user input associated with the user invocation of the keyguard function involves determining a duration of the last keystroke of the series of keystrokes.

An apparatus is provided in accordance with another embodiment of the invention. The apparatus includes a user input mechanism(s), and an input analyzer module configured to identify information input by way of one or more of the user input mechanisms. The apparatus includes a function designator module configured to identify a function based on the information input by way of the one or more user input mechanisms. A duration analyzer module is configured to determine an actuation duration of at least one of the user input mechanisms. The function designator module is further configured to invoke one of the sub-functions of the identified function based on the determined actuation duration.

According to a more particular embodiment of such an apparatus, the user input mechanism(s) includes one or more mechanical or electronic buttons; i.e. the user input mechanism(s) may include one or more mechanical buttons, one or more electronic buttons, or a plurality of buttons that can be a mixture of mechanical or electronic buttons. In another embodiment, the user input mechanism(s) includes one or more keys associated with a keypad. In still another embodiment, the user input mechanism(s) includes at least a touch screen and an associated graphical user interface.

In accordance with another embodiment of the invention, an apparatus is provided that includes at least one or more user input mechanisms and a processor. The processor is configured via program instructions to identify user input by way of one or more of the user input mechanisms, to identify a keyguard function based on the identified user input, to determine an actuation duration of at least a portion of the user input, and to invoke one of a normal keyguard sub-function or a security keyguard sub-function depending on the determined actuation duration.

In one embodiment, such an apparatus is represented by a mobile phone. In another embodiment, the apparatus is represented by a personal digital assistant. In yet another embodiment, the apparatus is represented by a computing system. Devices such as the mobile phone, personal digital assistant, and computing device are representative examples of such an apparatus, and clearly do not represent an exhaustive list of the devices that represent such an apparatus.

In accordance with another embodiment of the invention, computer-readable media is provided having instructions stored thereon that are executable by a processing system for facilitating input function designations. This media's instructions can be executed by the processing system to perform various functions, including recognizing user invocation of a keyguard function having at least a normal keyguard sub-function and security keyguard sub-function associated therewith, determining a duration of a user input associated with the user invocation of the keyguard function, and activating one of the normal keyguard sub-function or the security keyguard sub-function depending on the duration of the user input.

In still another embodiment of the invention, an apparatus is provided that includes structure for recognizing user invocation of a keyguard function having at least a normal keyguard sub-function and security keyguard sub-function associated therewith. Structure is also provided for determining a duration of a user input associated with the user invocation of the keyguard function. Structure is provided for activating one of the normal keyguard sub-function or the security keyguard sub-function depending on the duration of the user input.

The above summary of the present invention is not intended to describe each illustrated embodiment or implementation of the present invention. The figures and associated discussion that follows more fully describe representative embodiments of the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides systems, apparatuses and methods for facilitating input function designation. In one embodiment, activating a keyguard function is facilitated using a multiple-level user input, including a first function designation and a duration-based sub-function designation.

Figure 1:
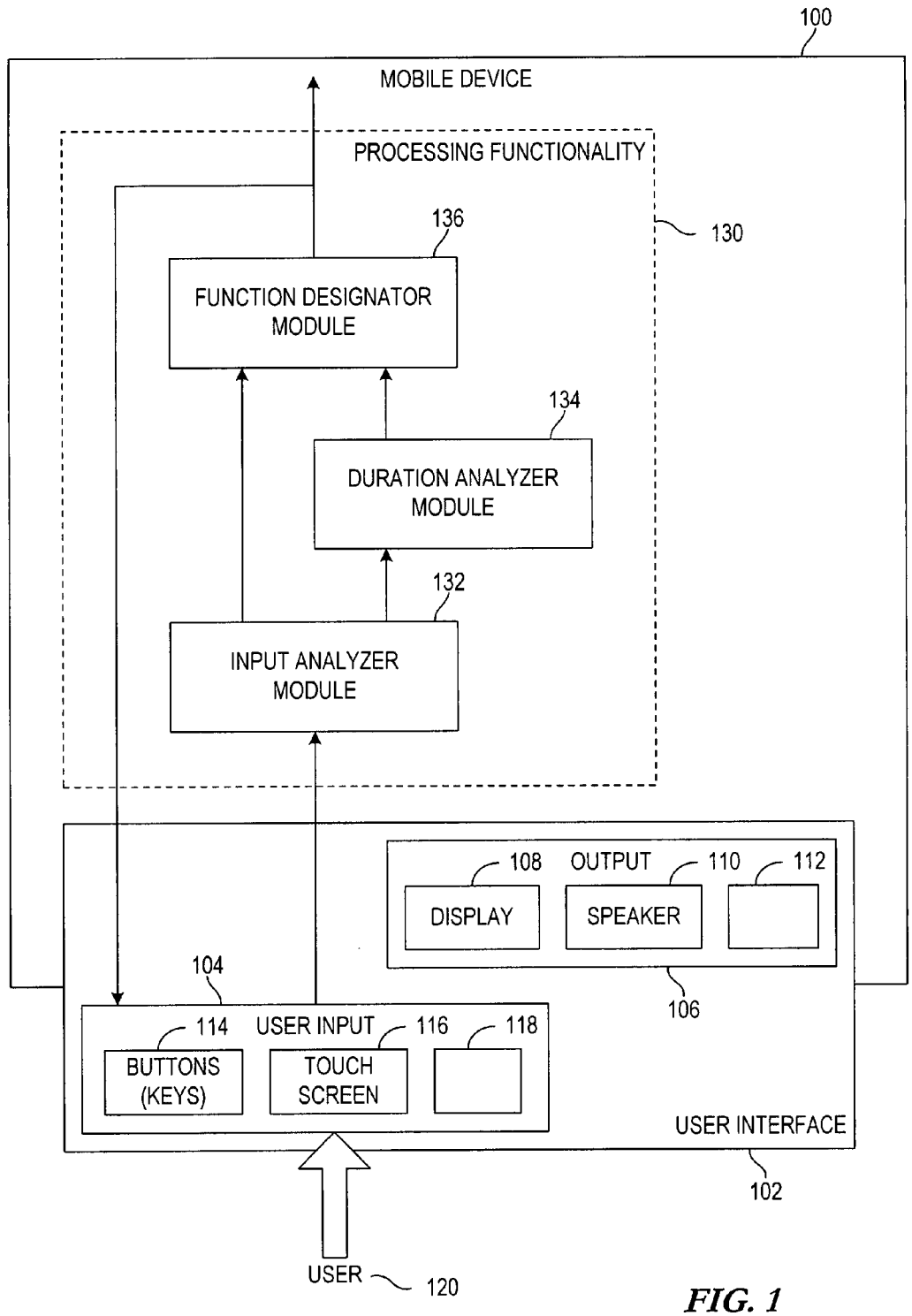
FIG. 1 is a block diagram generally illustrating a device incorporating features of a representative embodiment of the invention.

FIG. 1 is a block diagram generally illustrating a device incorporating features of a representative embodiment of the invention. In the illustrated embodiment, a mobile terminal 100 is depicted. While the present invention is applicable in non-mobile environments such as desktop and workstation computing systems, it is particularly beneficial in the context of mobile devices. In the case of mobile devices, user input is typically performed via keypads or other input mechanisms that do not inherently exhibit the efficiencies of their fully keyboard counterparts. For example, mobile devices such as mobile phones, personal digital assistants, laptop/notebook computers and/or other similar devices typically implement a keypad that does not involve a QWERTY layout, or otherwise involves a reduced size/function keyboard. Often users of such devices control the functions of the device using one hand, such as using the thumb of the hand that is holding the device. While the mobile nature of these devices is remarkably convenient, one drawback of this mobility is the reduced equipment size and consequent inconvenience in entering information or selecting functions. While the present invention is applicable to any device involving user input, the present invention is particularly beneficial in the context of such mobile devices where user input may be less convenient.

As shown in FIG. 1, the device 100 includes a user interface 102, which includes some type of user input 104 and perhaps user output 106 as well. The output 106 may include, for example, a display 108, speaker(s) 110 and/or other 112 output such as tactile output. The representative device 100 includes user input 104 that may include any one or more of buttons/keys 114, touch screen 116 and associated graphical user interface, and/or other 118 user input (e.g., joystick, microphone for voice commands, dials, touch pad, etc.).

Devices such as the mobile device 100 typically include numerous functions and settings for operating and otherwise utilizing the device 100. One such function is to lock the device keypad or other user input 104, so that the keys 114 or other input 116, 118 cannot inadvertently be triggered and consequently cause unwanted functions or actions to occur. For example, if a device is unlocked and placed in a user's 120 pocket, phone numbers could be inadvertently dialed and/or applications or functions could inadvertently be initiated. Such a locking function is referred to herein as a "keyguard" function.

In accordance with the invention, a keyguard function or other function can have multiple sub-functions associated therewith. For example, in the case of a keyguard function, one sub-function may be a normal keyguard function, another sub-function may be a security keyguard function, and so forth. As a more particular example, a normal keyguard function may simply lock or otherwise disable the keypad or other user input so that the mechanisms for facilitating user input cannot be inadvertently activated. Such a normal keyguard function can be turned off or otherwise disabled by any desired user input. A security keyguard may, on the other hand, lock or otherwise disable the keypad or user input in a similar manner, but may require a special code to be entered before the keypad/user input will again be available for use. This may be particularly beneficial where, for example, a device from a particular manufacturer has a known one or more keystrokes to unlock the keypad. If the device is misplaced or lost and gets into the hands of another person who is familiar with that manufacturer's keypad unlocking procedure, the device can be unlocked and utilized. On the other hand, if a security keyguard is lost and the user has locked the user input with a code known only to him/her, then this unique code can help prevent an unauthorized user from accessing or using the device if it is misplaced or lost.

When using such a security code, it can be troublesome to have to enter the security code to unlock the device every time it is used. Thus, it may not be desirable to only provide a security keyguard for such a device. In accordance with one embodiment of the invention, multiple security keyguards are provided, such as both a security keyguard and a normal keyguard, and the user is allowed to select which keyguard sub-function to utilize at any particular time. As previously indicated, manipulating the user input on devices, particularly smaller hand-held devices, can be inconvenient and/or somewhat difficult. The present invention provides a convenient manner in which a user can select a sub-function of a function, such as selecting one of the normal or security keyguard sub-functions of a keyguard function.

Referring again to FIG. 1, the representative mobile device 100 includes processing functionality 130 to provide such features. As will be described in greater detail below, the processing functionality 130 may be implemented in hardware, firmware, software and/or any combination thereof. For example, a software executable via a processor(s) may be utilized to fashion the various modules associated with the invention. In the embodiment of FIG. 1, an input analyzer 132 determines what input has been entered via the user interface. For example, the input analyzer can detect keystrokes that identify functions and sub-functions. As a more particular example, if the menu key <MENU> of a mobile phone is pressed, followed by the pressing of a star key <*>, the input analyzer detects that the <MENU> and <*> keys were pressed. Based on the input identified at the input analyzer module 132, the function designator module 136 can determine what associated function, sub-function, etc. is desired. The duration analyzer module 134 determines how long a user input is activated, such as the length of time that a particular key on a keypad is pressed and therefore activated by the user. For example, the duration analyzer module can use hardware and/or software to determine the length of time in which the input signal produced by an actuated input mechanism is at an activated level.

In accordance with one embodiment of the invention, a normal keyguard sub-function and a security keyguard sub-function are associated with a keyguard function. To designate use of the normal keyguard function, the user inputs some particular input via the user input 104. For ease of input and for remembering the proper input 104 to activate, one embodiment involves using the same key sequences to activate a security keyguard as that used to activate the normal keyguard. However, a durational attribute is associated with one or more of the user input actions to differentiate between the plurality of sub-functions, which are the normal and security keyguard sub-functions in the present example.

For example, pressing the menu <MENU> key followed by the star <*> key may represent the keyguard function, where the duration in which the star <*> key is pressed indicates which keyguard sub-function is desired. The input analyzer module 132 thus identifies the user input of the <MENU> and <*> keys 114, and the durational analyzer module 134 determines the length of time that the star <*> key was pressed. Based on the input identified by the input analyzer module 132 and the duration of the input determined by the duration analyzer module 134, the function designator module can determine which sub-function of the function is to be activated. For example, if the input analyzer module 132 identifies the user input to be the <MENU> and <*> keys 114, and the durational analyzer module 134 determines that the <*> key was pressed for less than a time threshold (e.g., three seconds), then the function designator module 136 may identify this as a normal keyguard sub-function that does not require a security code to later unlock the user input mechanisms. On the other hand, if the input analyzer module 132 identifies the user input to be the <MENU> and <*> keys 114, and the durational analyzer module 134 determines that the <*> key was pressed for more than a time threshold (e.g., three seconds), then the function designator module 136 may identify this as a security keyguard sub-function that requires entry of a security code to later unlock the user input mechanisms.

Figure 2:
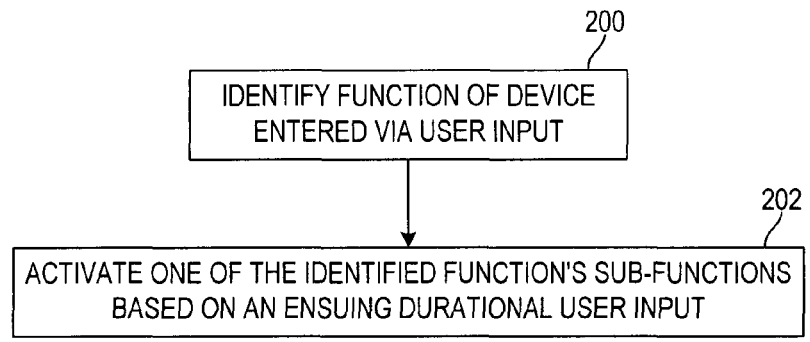
FIGS. 2 and 3 illustrate exemplary embodiments of methods for facilitating input function designation in accordance with the present invention.

FIG. 2 is a flow diagram illustrating an exemplary method for facilitating input function designation in accordance with the present invention. A function of the device that is entered via a user input is identified 200. For example, that function may be a keyguard function as previously described. One of the identified function's sub-functions is activated 202, based on an ensuing durational user input. For example, either a normal keyguard sub-function or a security keyguard sub-function associated with a keyguard function may be activated based on the length of time that a key/button or other user interface mechanism is depressed or otherwise manipulated.

Figure 3:
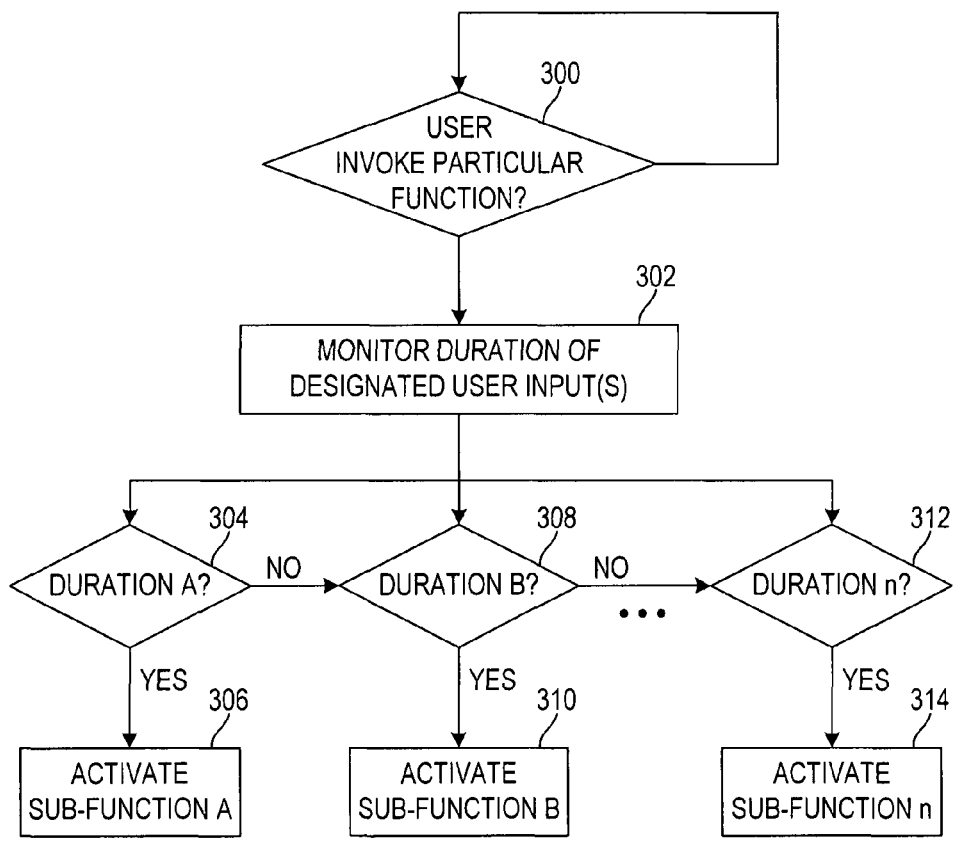

FIG. 3 illustrates a more particular embodiment of a method for facilitating input function designation in accordance with the present invention. It is determined 300 whether a particular function is invoked. For example, if a particular key is pressed, a particular series of keystrokes is pressed, or some other established user input is actuated, this can represent a particular function such as a keyguard function. For example, a user may press a menu <MENU> key followed by the star <*> key to identify the keyguard function. The duration of one or more of the user inputs is monitored 302. The user input(s) monitored may be the last input in a plurality of UI input manipulations. In one embodiment, the function is identified by way of actuation of a single keystroke or other user input mechanism, and the duration of actuation of this single keystroke/user input mechanism can be monitored 302. In another embodiment, the function is identified by way of multiple keystrokes, and any desired one or more of those function-identifying keystrokes may be the keystroke(s) that is monitored 302. In another embodiment, the last of the plurality of keystrokes is the user input that is monitored 302 for its actuation duration. In yet another embodiment, the user input that is monitored 302 for its duration is a keystroke(s) that follows the user input that identifies the function. Thus, the user input monitored for its duration may or may not also be involved in the identification of the function itself.

According to the embodiment of FIG. 3, different sub-functions are associated with different user input actuation durations. For example, if as determined at decision block 304 that the user input(s) is actuated for a time within a first duration A, then sub-function A is activated 306. Similarly, if it is determined 308 that the user input(s) is actuated for a time within a second duration B, then sub-function B is activated 310. Such a durational identification of sub-functions can be used for any number of sub-functions, as depicted by the determination 312 that the user input(s) is actuated for a time within some duration n, whereby sub-function n is activated 314.

Figure 4:
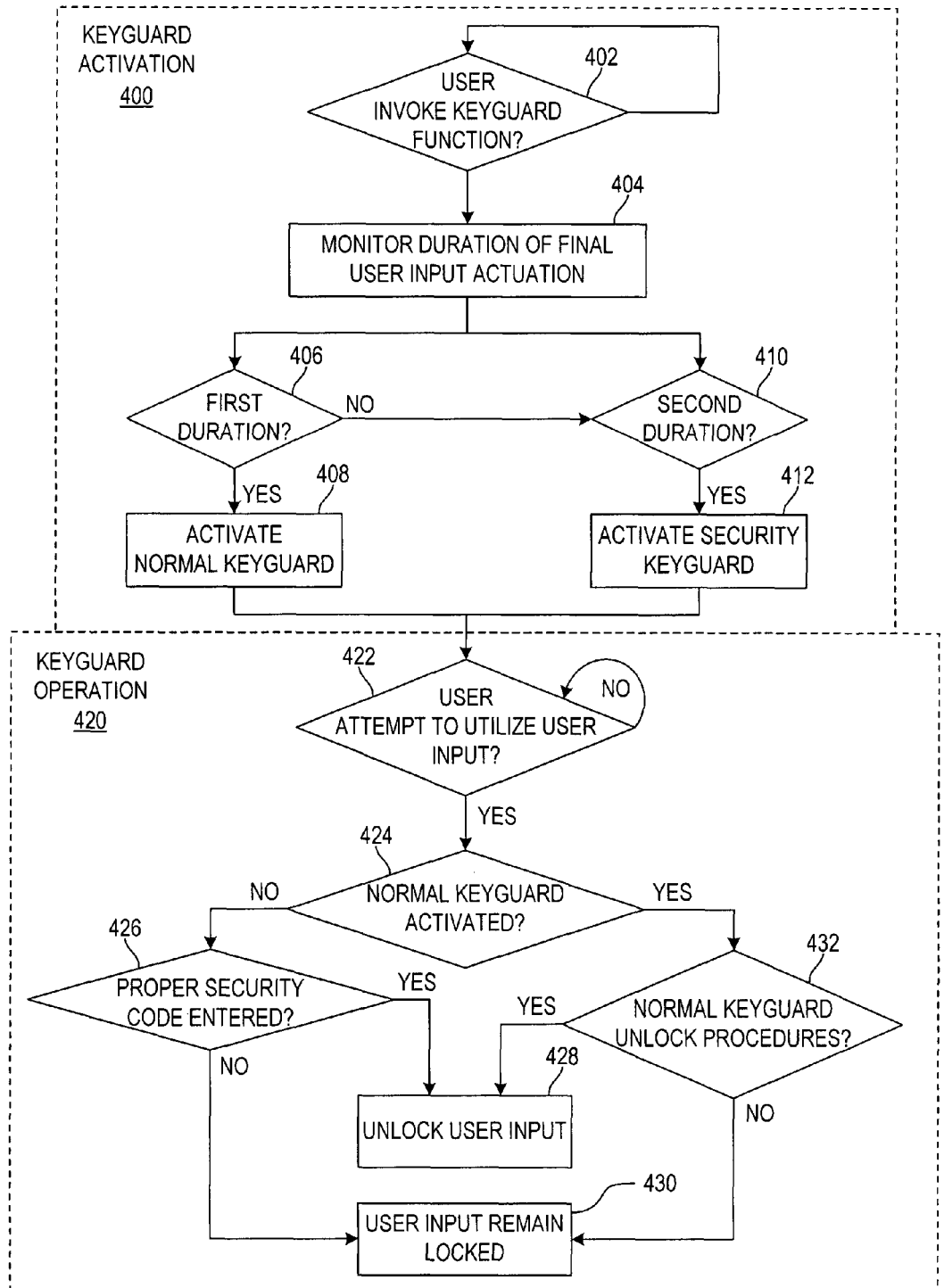
FIG. 4 is a flow diagram illustrating an embodiment of the invention involving a keyguard function having at least normal and security keyguard sub-functions.

FIG. 4 is a flow diagram illustrating an embodiment of the invention involving a keyguard function having at least normal and security keyguard sub-functions. In the illustrated embodiment, a keyguard activation 400 phase is first performed. It is determined 402 whether the keyguard function is invoked. For example, one embodiment involves invoking the keyguard function when a user actuates a menu <MENU> key followed by the star <*> key, although any keys, buttons, dials, icons, and/or other user interface mechanism may be employed. In the illustrated embodiment, the duration of the final keystroke (e.g., star <*> key) of the function-identifying series of keystrokes is monitored 404. If the duration that the final keystroke is within a first known duration as determined at decision block 406, the normal keyguard is activated 408. If the duration that the final keystroke is within a second known duration as determined at decision block 410, the security keyguard is activated 412. In the illustrated embodiment, it is assumed that the user has already stored what the security code will be to unlock the user input upon entering the security code.

The keyguard operation 420 phase involves unlocking or otherwise disabling the keyguard feature that was set during the keyguard activation 400 phase. For example, when a user later attempts to utilize the user input as determined at decision block 422, use of the keypad or other user input mechanisms involves first disabling the appropriate keyguard sub-function. In one embodiment, if the normal keyguard was not activated as determined at decision block 424, this indicates that the other sub-function (security keyguard in the illustrated embodiment) is active. If the proper security code is then entered 426, the user input will be unlocked 428. Otherwise the user input will remain locked 430.

If the normal keyguard was activated rather than the security keyguard as determined at decision block 424, it is determined 432 whether the normal keyguard unlock procedure is followed. For example, if the normal keyguard unlock procedure involves simple, non-durational actuation of a key sequence (e.g., MENU+*), it is determined 432 whether that key sequence in fact was followed. If not, the user input remains locked 430. If the proper key sequence was entered, the user input is unlocked 428.

Figure 5:
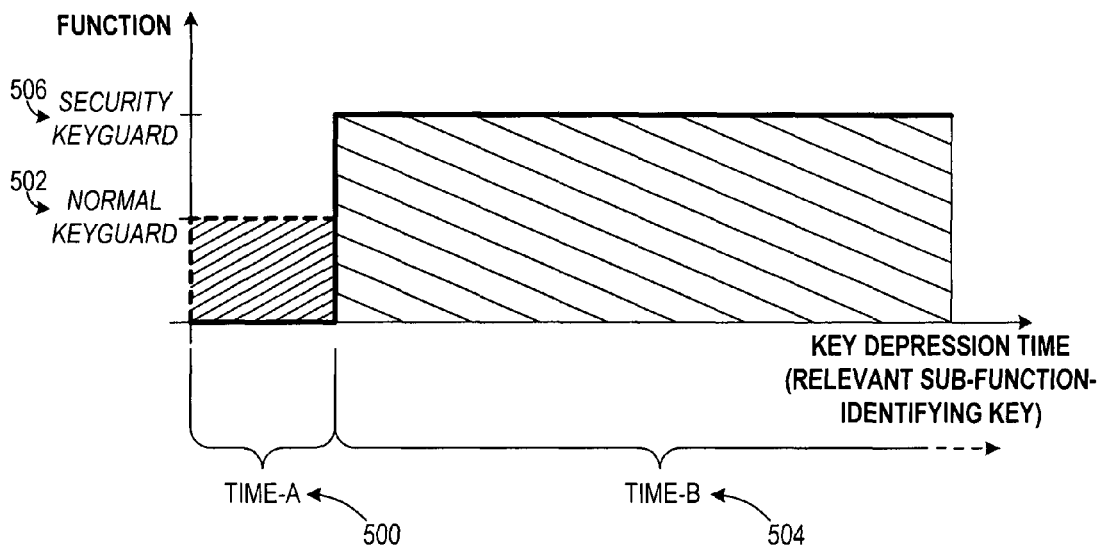
FIG. 5 is a timing diagram generally illustrating selection of a sub-function using differing user input actuation durations in accordance with one embodiment of the invention.

FIG. 5 is a timing diagram generally illustrating selection of a sub-function using differing user input actuation durations in accordance with one embodiment of the invention. In the illustrated embodiment, the function is assumed to be a keyguard function, and the sub-functions include a normal keyguard function and a security keyguard function. For purposes of explanation, it is assumed that the relevant user input actuations are device key depressions. It is also assumed that any initial keystroke(s) to identify the function have been actuated, and a final duration-based keystroke that identifies the appropriate one of a plurality of sub-functions is considered. If the relevant key in which the actuation duration is involved is the star <*> key, then actuation of that key for a time no longer than a first time-A 500 will result in the normal keyguard 502 sub-function being designated. On the other hand, if the actuation of the relevant key is performed for a time longer than time-A 500 and any time within time-B 504, then the security keyguard 506 is designated. The timing diagram of FIG. 5 can be applied to any number of sub-functions involved; i.e., time durations in addition to the time-A 500 and time-B 504 may be implemented, such as in the case where additional sub-functions are involved.

Figure 6:
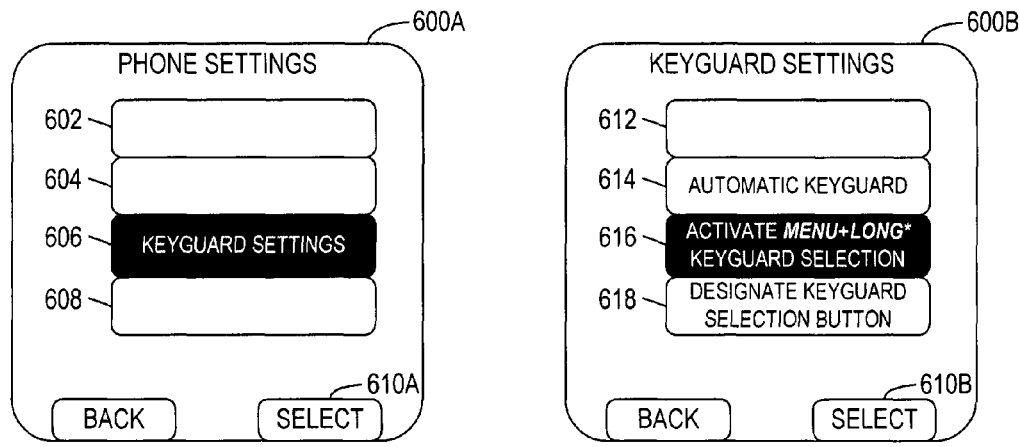
FIG. 6 generally illustrates a representative manner in which a user can specify the manner in which keyguard operation will be effected.

FIG. 6 generally illustrates a representative manner in which a user can specify the manner in which keyguard operation will be effected. The example of FIG. 6 is merely for purposes of explanation, and any desired user interface mechanism(s) may be used to specify function/sub-function selection. In the illustrated embodiment, a device screen or display 600A is shown with a plurality of selectable items 602, 604, 606, 608 presented via a graphical user interface. The user may navigate to a settings screen 600A in any known manner. Selectable items may enable the user to specify settings for functions and/or their associated sub-functions. For example, in the case of a keyguard function, the settings presentation may provide a selectable "keyguard settings" 606 option as shown via display screen 600B. Upon selection 610A of such an option, the user may be presented with one or more other options 612, 614, 616, 618, etc. For example, the user may be able to designate the keyguard selection button/key that will serve as the durational input key. As a more particular example, the user can select the option 618, and specify that the star <*> key will be the durational input key, or that a particular user-defined key will serve that purpose, etc. In another embodiment, the user may be provided an option 616 that enables and disables the durational input feature. For example, if the user opts to use a security keyguard but does not want the duration-based input to differentiate between sub-functions, the user can specify that via the option 616. On the other hand, the option 616 may allow the user to enable this feature, thereby allowing the duration-based sub-function identification as described herein.

Figure 7A:
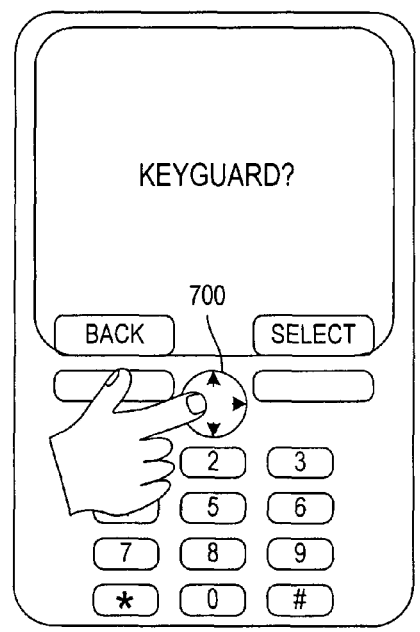
FIGS. 7A, 7B and 7C illustrate a representative use case involving user identification of particular keyguard sub-functions via duration-based input.
Figure 7B:
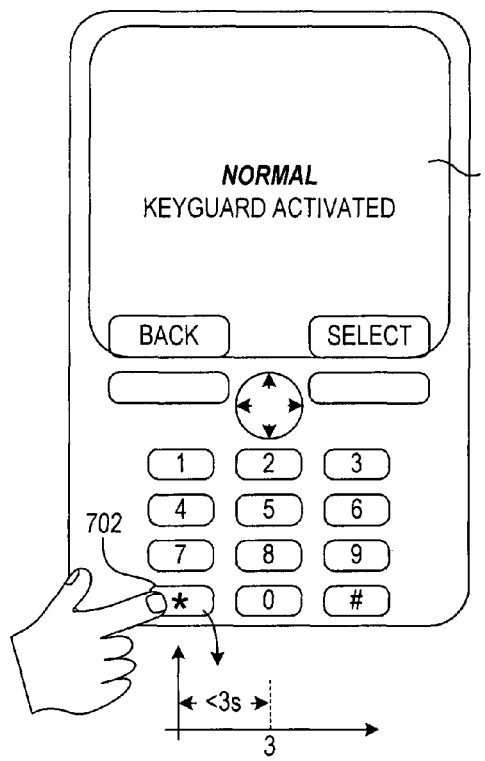
Figure 7C:
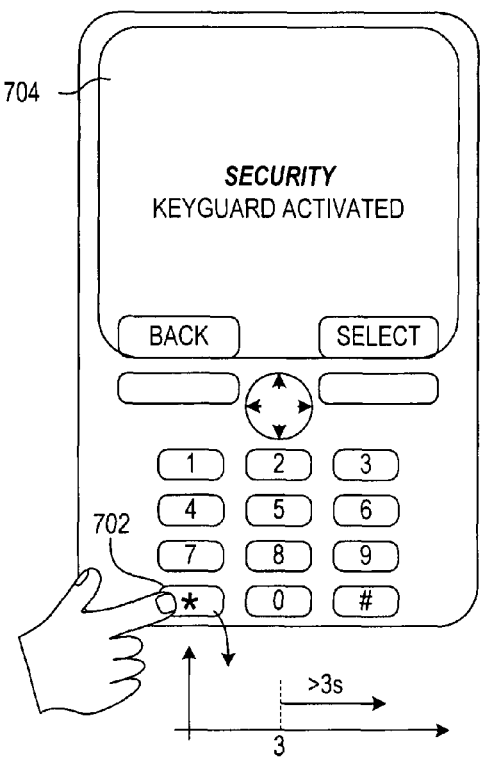

FIGS. 7A, 7B and 7C illustrate a representative use case involving user identification of particular keyguard sub-functions via duration-based input. As shown in FIG. 7A, the user may actuate a first user input, such as a menu button 700. In accordance with the illustrated embodiment, a sequence of key entries are used to identify the function/sub-function, and thus a second key 702 is involved as shown in FIGS. 7B and 7C. In the illustrated embodiment, this key 702 represents the duration-based input. If the key 702 is depressed or otherwise actuated for less than a predetermined time (e.g., three seconds), the normal keyguard is activated as shown via the display screen 704 of FIG. 7B. If the key 702 is depressed or otherwise actuated for at least the predetermined time (e.g., three seconds), the security keyguard is activated as shown via the display screen 704 of FIG. 7C. In this manner, the user can designate which of the keyguard sub-functions, namely the normal or the security keyguard, is currently to be implemented.

There are also various manners in which the user can be notified of the particular keyguard function that is currently active. Thus, one embodiment involves providing some notification to the user of whether the security keyguard is active, or whether the normal keyguard is active, or alternatively a notification identifying which of the plurality of keyguards is active. Such a notification may be presented to the user visually, audibly, through tactile feedback, and/or other manner by way of the device. For example, a visual, textual indication of which security keyguard is active may be presented upon power up of the device. Another example is to present this between on and off options of the keyguard function.

Figure 8:
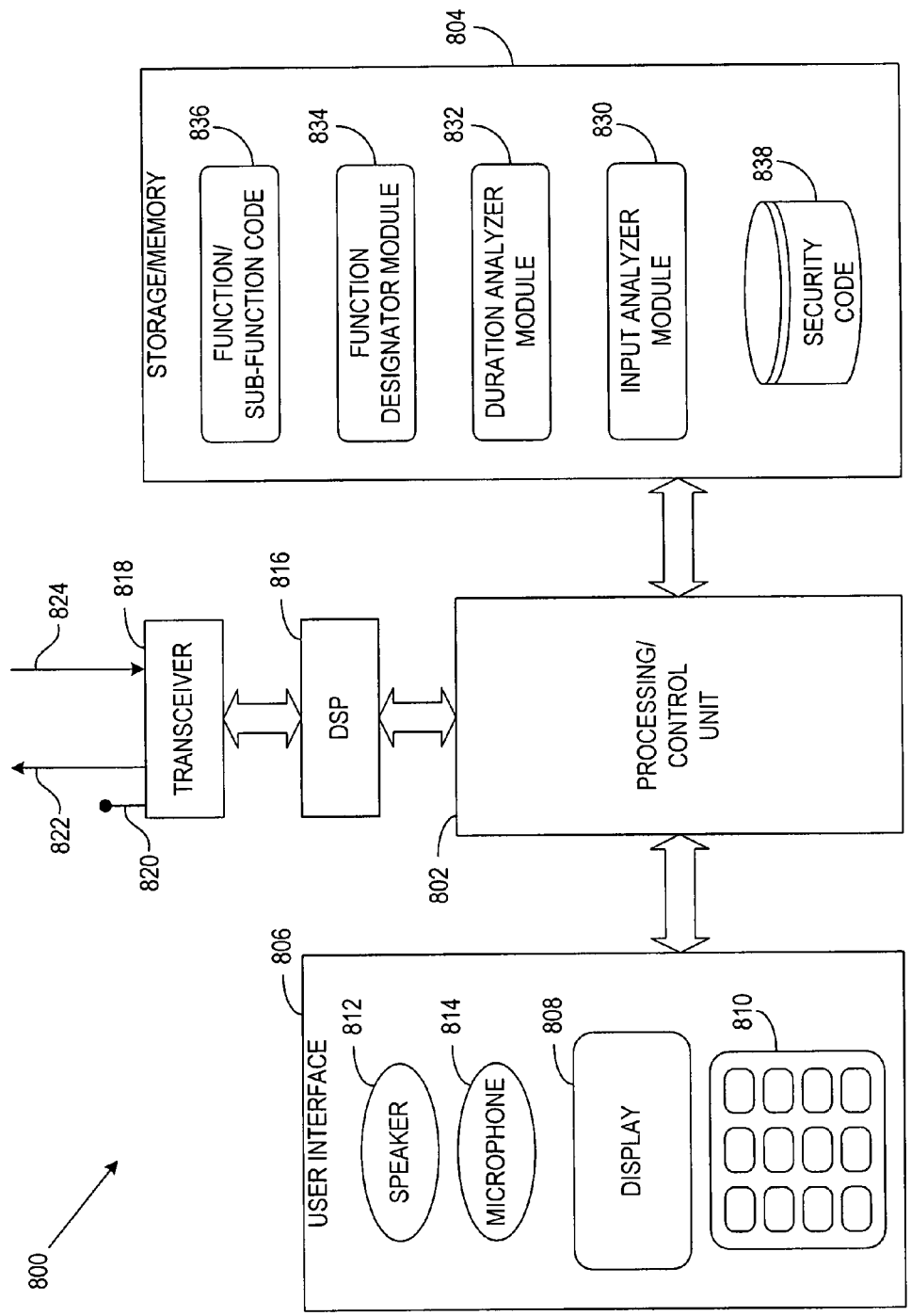
FIG. 8 illustrates a representative example of a mobile device which may incorporate the keyguard functions/sub-functions in accordance with the present invention.

Hardware, firmware, software or a combination thereof may be used to perform the device functions and operations in accordance with the invention. The requesting devices in accordance with the invention include communication devices such as, for example, mobile phones, PDAs and other wireless communicators, as well as landline computing systems and communicators. FIG. 8 illustrates a representative example of a mobile device which may incorporate the keyguard functions/sub-functions in accordance with the present invention. The mobile device 800 utilizes computing systems to control and manage the conventional device activity as well as the functionality provided by the present invention. The representative mobile device 800 includes a computing system capable of carrying out operations in accordance with the invention. For example, the representative mobile device 800 includes a processing/control unit 802, such as a microprocessor, reduced instruction set computer (RISC), or other central processing module. The processing unit 802 need not be a single device, and may include one or more processors. For example, the processing unit may include a master processor and associated slave processors coupled to communicate with the master processor.

The processing unit 802 controls the basic functions of the mobile device 800 as dictated by programs available in the program storage/memory 804. The storage/memory 804 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the mobile device. The storage 804 may also include one or more of other types of read-only memory (ROM) and programmable and/or erasable ROM, random access memory (RAM), subscriber interface module (SIM), wireless interface module (WIM), smart card, or other fixed or removable memory device. The relevant software for carrying out mobile device operations in accordance with the present invention may also be transmitted to the mobile device 800 via data signals, such as being downloaded electronically via one or more networks, such as the Internet and an intermediate wireless network(s).

For performing other standard mobile device functions, the processor 802 is also coupled to user-interface 806 associated with the mobile device 800. The user-interface (UI) 806 may include, for example, a display 808 such as a liquid crystal display, a keypad 810, speaker 812, microphone 814, etc. These and other UI components are coupled to the processor 802 as is known in the art. Other UI mechanisms may be employed, such as voice commands, switches, touch pad/screen, graphical user interface using a pointing device, trackball, joystick, or any other user interface mechanism. Any user input mechanism may be used in connection with the device 800, and may be subject to the functions/sub-functions (e.g., normal/security keyguard) previously described.

The wireless device 800 may also include conventional circuitry for performing wireless transmissions over the mobile network. The digital signal processor(s) (DSP) 816 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 818, generally coupled to an antenna 820, transmits the outgoing radio signals 822 and receives the incoming radio signals 824 associated with the mobile device 800. For example, signals 822, 824 may be transmitted to a circuit-switched and/or packet-switched network via a Radio Access Network (RAN), such as provided via the Global System for Mobile communications (GSM).

In the illustrated embodiment, the storage/memory 804 stores various client programs. The input analyzer module 830, duration analyzer module 832 and function designator module 834 are analogous to the respective modules 132, 134, 136 of FIG. 1. The function/sub-function code module 836 represents the programs or other code forming the designated function(s)/sub-function(s) themselves. For example, the function/sub-function code 836 may include program code operable with the processing/control unit 802 to carry out the normal and security keyguard functions/sub-functions previously described. Data may also be stored, such as the stored security code(s) 838 in the case of a security keyguard. In such a case, a compare module (not shown) would also be provided to compare the stored security code 838 to the user-entered security code.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "article of manufacture," "computer program product," "computer-readable media" and other similar terms as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, the Internet, intranets, telephone/modem-based network communication, hard-wired/cabled communication network, satellite communication, and other stationary or mobile network systems/ communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the methods of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein, and the claims appended hereto.

What is claimed is:

1. A method comprising:
   identifying a keyguard function of a mobile device specified via a plurality of user input actuations; and
   activating one of a plurality of keyguard sub-functions comprising a normal keyguard sub-function and a security keyguard sub-function of the identified keyguard function based on a duration of actuation of an associated last user input in the plurality of user input actuations.

2. The method of claim 1, wherein identifying a keyguard function of the mobile device specified via a plurality of user input actuations comprises identifying the keyguard function via a plurality of keystrokes, and wherein activating one of the keyguard sub-functions comprises activating the one of the keyguard sub-functions associated with a duration in which the last of the plurality of keystrokes is actuated.

3. The method of claim 1, wherein a first of the keyguard sub-functions is associated with a user input of a first duration and a second of the keyguard sub-functions is associated with the user input of a second duration, and wherein activating one of the keyguard sub-functions comprises activating the first keyguard sub-function when the user input has been actuated for a duration no greater than the first duration.

4. The method of claim 1, wherein a first of the keyguard sub-functions is associated with a user input of a first duration and a second of the keyguard sub-functions is associated with the user input of a second duration, and wherein activating one of the keyguard sub-functions comprises activating the second keyguard sub-function when the user input has been actuated for a duration greater than or equal to the second duration.

5. The method of claim 1, wherein:
   a first of the keyguard sub-functions is associated with a user input of a first duration and a second of the keyguard sub-functions is associated with the user input of a second duration; and
   activating one of the keyguard sub-functions comprises activating the first keyguard sub-function when the user input has been actuated for a duration no greater than the first duration, and activating the second keyguard sub-function when the user input has been actuated for a duration greater than or equal to the second duration.

6. A method comprising:
   recognizing user invocation of a keyguard function having at least a normal keyguard sub-function and security keyguard sub-function associated therewith based on a plurality of user input actuations;
   determining a duration of actuation of a last user input in the plurality of user input actuations associated with the user invocation of the keyguard function; and
   activating one of the normal keyguard sub-function or the security keyguard sub-function depending on the duration of actuation of the last user input.

7. The method of claim 6, wherein the keyguard function comprises one or more additional sub-functions, and wherein activating one of the normal keyguard sub-function or the security keyguard function comprises activating one of the normal keyguard sub-function, security keyguard sub-function, or additional sub-function depending on the duration of actuation of the last user input.

8. The method of claim 6, further comprising determining whether the duration of actuation of the last user input falls within a first or second predetermined duration range, and wherein activating one of the normal or security keyguard sub-functions comprises activating the normal keyguard if the duration falls within the first predetermined duration range and activating the security keyguard if the duration falls within the second predetermined duration range.

9. The method of claim 6, wherein recognizing one or more user input actuations comprises recognizing a series of keystrokes on a keypad, and wherein determining a duration of a user input associated with the user invocation of the keyguard function comprises determining a duration of the last keystroke of the series of keystrokes.

10. An apparatus comprising:
    one or more user input mechanisms;
    an input analyzer module configured to identify information input via a plurality of user input actuations using one or more of the user input mechanisms;
    a function designator module configured to identify a keyguard function based on the information input via the plurality of user input actuations; and
    a duration analyzer module configured to determine an actuation duration of at least the last actuated user input mechanism; and
    wherein the function designator module is further configured to invoke one of a normal keyguard sub-function and a security keyguard sub-function of the identified keyguard function based on the determined actuation duration.

11. The apparatus as in claim 10, wherein the one or more user input mechanisms comprises one or more mechanical or electronic buttons.

12. The apparatus as in claim 10, wherein the one or more user input mechanisms comprises one or more keys associated with a keypad.

13. The apparatus as in claim 10, wherein the one or more user input mechanisms comprises at least a touch screen and an associated graphical user interface.

14. An apparatus comprising:
    one or more user input mechanisms;
    memory including computer program code; and
    a processor configured, with the memory and the computer program code, to cause the apparatus at least to:
    identify a plurality of user input actuations via one or more of the user input mechanisms, identify a keyguard function based on the identified plurality of user input actuations, determine an actuation duration of at least a last portion of the plurality of user input actuations, and invoke one of a normal keyguard sub-function or a security keyguard sub-function depending on the determined actuation duration.

15. The apparatus as in claim 14, wherein the apparatus comprises a mobile phone.

16. The apparatus as in claim 14, wherein the apparatus comprises either of a personal digital assistant or computing system.

17. A non-transitory computer-readable medium having instructions stored thereon which are executable by a processing system by performing steps comprising:
   recognizing user invocation of a keyguard function having at least a normal keyguard sub-function and security keyguard sub-function associated therewith based on a plurality of user input actuations;
   determining a duration of actuation of a last user input in the plurality of user input actuations associated with the user invocation of the keyguard function; and
   activating one of the normal keyguard sub-function or the security keyguard sub-function depending on the duration of actuation of the last user input.

18. An apparatus comprising:
   means for recognizing user invocation of a keyguard function having at least a normal keyguard sub-function and security keyguard sub-function associated therewith based on a plurality of user input actuations;
   means for determining a duration of actuation of a last user input in the plurality of user input actuations associated with the user invocation of the keyguard function; and
   means for activating one of the normal keyguard sub-function or the security keyguard sub-function depending on the duration of actuation of the last user input.

* * * * *